(12) United States Patent
Ostrom (10) Patent No.: US 6,661,212 B2
(45) Date of Patent: *Dec. 9, 2003

(54) WIDEBAND REGULATOR WITH FAST TRANSIENT SUPPRESSION CIRCUITRY

(75) Inventor: Kenneth A. Ostrom, Palos Verdes Estates, CA (US)

(73) Assignee: Primarion, Tempe, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/338,575

(22) Filed: Jan. 8, 2003

(65) Prior Publication Data

US 2003/0098674 A1 May 29, 2003

Related U.S. Application Data

(63) Continuation of application No. 09/944,417, filed on Aug. 31, 2001.
(60) Provisional application No. 60/229,621, filed on Aug. 31, 2000.

(51) Int. Cl.[7] .............................. G05F 1/40; H02M 3/24
(52) U.S. Cl. ...................... 323/276; 323/274; 363/97; 327/538
(58) Field of Search ................................ 323/274, 268, 323/272, 282, 284, 288, 222, 276; 363/37, 34, 141, 147, 97; 327/545, 538, 540

(56) References Cited

U.S. PATENT DOCUMENTS

| 3,908,163 A | 9/1975 | Gilmore |
| 5,471,167 A | 11/1995 | L'Hermite et al. |
| 5,479,090 A | 12/1995 | Schultz |
| 5,621,627 A | 4/1997 | Krawchuk et al. |
| 5,629,608 A | 5/1997 | Budelman |
| 5,847,951 A | 12/1998 | Brown et al. |
| 5,850,113 A | 12/1998 | Weimer et al. |
| 5,982,156 A | 11/1999 | Weimer et al. |
| 6,028,417 A | 2/2000 | Ang et al. |

*Primary Examiner*—Rajnikant B. Patel
(74) *Attorney, Agent, or Firm*—Snell & Wilmer (57) ABSTRACT

A wideband voltage regulator is configured to provide suppression of fast transients, which can include a boosting circuit and a sensing circuit. The boosting circuit can be suitably configured to boost the voltage regulator response, while the sensing circuit can determine when such a boost may be desired. Accordingly, the response of the voltage regulator can be accelerated to a fast load transient beyond the closed loop bandwidth limited response or the slew rate limited response of the voltage regulator. An exemplary voltage regulator can be configured with an active sensing circuit comprising a sensing amplifier with switch control outputs, and a boosting circuit comprising N stored charge sources, e.g.; boost capacitors, and (3N−1) switches that are configured to accelerate the voltage regulators response to a fast load transient beyond the closed loop bandwidth limited or slew rate limited response of the voltage regulator.

36 Claims, 5 Drawing Sheets

WIDEBAND REGULATOR WITH FAST TRANSIENT SUPPRESSION CIRCUITRY

CROSS-REFERENCE TO RELATED APPLICATIONS

This application is a continuation of Ser. No. 09/944,417 filed Aug. 31, 2001 which claims priority from prior U.S. Provisional Application Ser. No. 60/229,621, entitled "Wideband Regulator With Fast Transient Suppression Circuitry," filed Aug. 31, 2000, and hereby incorporated herein by reference.

FIELD OF INVENTION

The present invention relates to voltage regulators, and in particular, to wideband voltage regulators for use with microprocessor, microcontrollers or other like high-frequency devices in which suppression of current transients is desired.

BACKGROUND OF THE INVENTION

As the speed of high performance microprocessors increases, consistent with CMOS transistor feature size reductions, the required power supply voltage continues to shrink. Further, the increased load and higher processor speed results in more severe current transients on the microprocessor's power supply. For example, as microprocessors execute instructions, particularly at faster rates, severe transients can occur. These severe current transients, if not properly regulated, can cause noise on the power supply that can induce errors in the microprocessor.

Typically, extensive decoupling techniques, wherein capacitors are placed across the load between the supply and ground references, in combination with active voltage regulation, are used to supply the instantaneous charge required by the microprocessor under dynamic operation. On-chip decoupling, e.g., on the integrated die, generally takes excessive chip area and reduces reliability. Off-chip decoupling typically has limited effectiveness because of the parasitic inductance in the power supply leads. In addition, off-chip as well as on-chip active voltage regulation employing conventional circuit design approaches lacks the bandwidth to respond to fast load transients and typically has limited effectiveness because of the parasitic inductance in the power supply leads.

Figure 1:
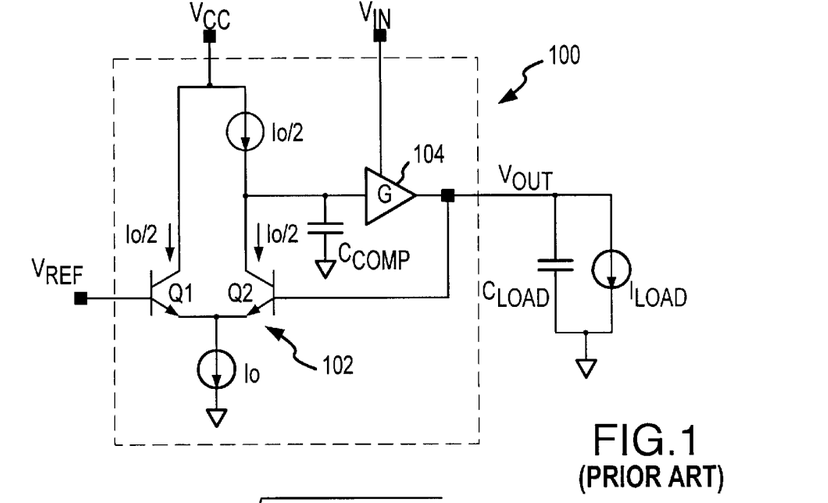
FIG. 1 illustrates a schematic diagram of a prior art voltage regulator configuration.

A conventional wideband voltage regulator 100 is illustrated in FIG. 1, wherein $V_{IN}$ is an input power supply, $V_{OUT}$ is a regulated output supply, $V_{CC}$ is a voltage source required to bias the regulator circuitry, and which may be common with input power supply $V_{IN}$, $V_{REF}$ is a voltage reference which determines the regulated output voltage supply $V_{OUT}$, and an amplifier 104 that comprises an output buffer amplifier having a gain G. During operation, load current supplied to regulated output supply $V_{OUT}$ is primarily drawn from the input power supply $V_{IN}$. In addition, a closed loop differential transconductance amplifier 102 formed by transistors Q1 and Q2 senses the difference between output voltage $V_{OUT}$ and reference voltage $V_{REF}$ and, through its feedback arrangement, strives to minimize the difference between the two voltages, $V_{OUT}$ and $V_{REF}$.

Figure 2:
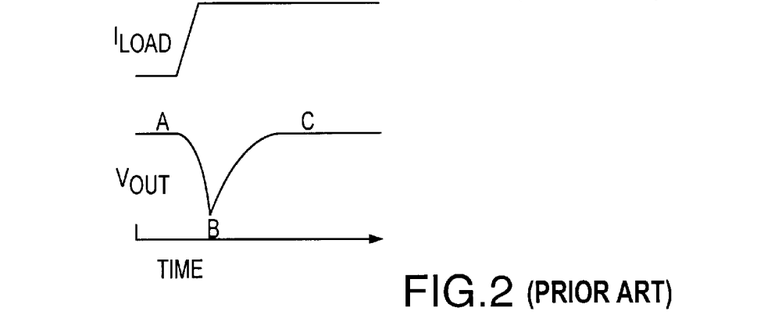
FIG. 2 illustrates a response diagram of a prior art voltage regulator in response to fast load transients.
Figure 3:
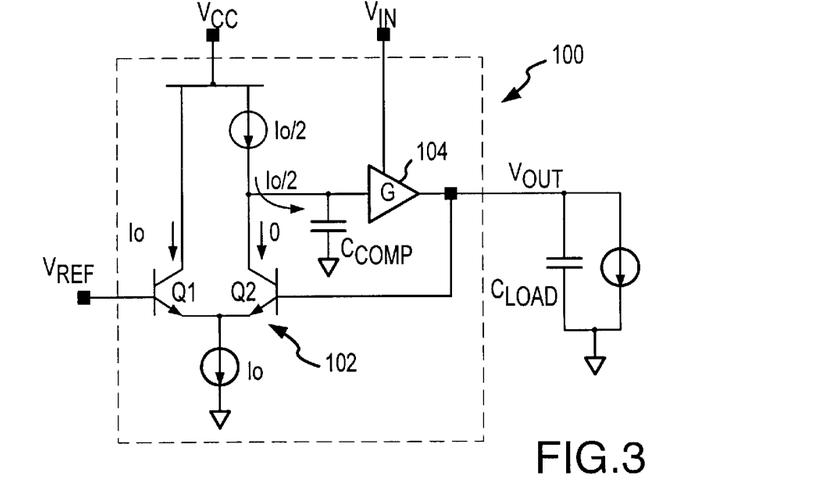
FIG. 3 illustrates a schematic diagram of a prior art voltage regulator during slewing operations.

The effectiveness of a conventional wideband voltage regulator, such as regulator 100, to respond to fast load transients is primarily a function of the small signal bandwidth of regulator 100, the output impedance of output buffer amplifier 104 and the large signal slew rate performance of regulator 100. With reference to FIGS. 2 and 3, which illustrates the response to fast load transients of regulator 100, under severe fast load transients, e.g., state "B" in FIG. 2, input transconductance amplifier 102 formed by Q1 and Q2 can fully switch, and the reaction response of the voltage regulator 100 can then be initially limited by the large signal slew rate performance of amplifier 102. Under this condition; the response of amplifier 102 becomes "slew rate limited" and the rate of change of the output voltage can react no faster than the ratio of $I_0/(2*C_{COMP})$. However, simply increasing the amplifier quiescent current ($I_0$) will not allow improvement of the slew rate, since doing so will raise the open loop gain of amplifier 102 by the same factor. Thus, an equivalent increase in the compensation capacitor ($C_{COMP}$) is required to achieve the same closed loop phase margin. Moreover, other techniques such as emitter degeneration, or the use of low $g_m$ FET devices, will slightly improve slew rate performance but at the cost of open loop gain required for regulation accuracy.

Accordingly, a need exists for a wideband voltage regulator which overcomes the problems of high current transients, and does not have the limitations of the prior art with respect to slew rate and regulation accuracy.

SUMMARY OF THE INVENTION

The method and circuit according to the present invention addresses many of the shortcomings of the prior art. In accordance with various aspects of the present invention, a wideband voltage regulator is provided which can provide suppression of fast transients. In accordance with an exemplary embodiment, a voltage regulator can include a boosting circuit and a sensing circuit. The boosting circuit can be suitably configured to boost the voltage regulator response, while the sensing circuit can determine when such a boost may be desired. Accordingly, the response of the voltage regulator can be accelerated to a fast load transient beyond the closed loop bandwidth limited response or the slew rate limited response of the voltage regulator.

In accordance with various exemplary embodiments, an exemplary voltage regulator can be configured with an active sensing circuit comprising a sensing amplifier with switch control outputs, and a boosting circuit comprising N stored charge sources and (3N−1) switches that are configured to accelerate the voltage regulators response to a fast load transient beyond the closed loop bandwidth limited or slew rate limited response of the voltage regulator. The stored charge sources can comprise various components, such as boost capacitors, additional power supplies, or actively biased devices.

In accordance with another aspect of the present invention, the sensing circuit can be configured in various manners. In accordance with an exemplary embodiment, a method for determining when the sensing circuit can switch the state of the stored charge sources can comprise a comparison of the output voltage of the regulator to a constant reference voltage. In accordance with another exemplary embodiment, the sensing circuit can switch the state of the stored charge sources by comparing the voltage drop across the parasitic inductance between the voltage regulator output and the load to a constant reference voltage, or by comparing the difference between the voltage drop across the parasitic inductance of the supply side and the ground return of the load. Further, the sensing circuit can be triggered on a one-shot basis with preset pulse width, or by any other suitable trigger methodology. Still further, a differential offset voltage can be added to the sense amplifier to suitably adjust or configure the sensitivity of the sensing circuit.

BRIEF DESCRIPTION OF DRAWING FIGURES

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g., resistors, transistors, capacitors, diodes and the like, whose values may be suitably configured for various intended purposes. In addition, the present invention may be practiced in any integrated circuit application where high-frequency, low-voltage requirements are desired. Such general applications that may be appreciated by those skilled in the art in light of the present disclosure are not described in detail herein. However for purposes of illustration only, exemplary embodiments of a voltage regulator will be described herein. Further, it should be noted that while various components may be suitably coupled or connected to other components within exemplary circuits, such connections and couplings can be realized by direct connection between components, or by connection through other components and devices located therebetween.

As discussed above, prior art voltage regulators have difficulty responding to fast load transients. Moreover, conventional techniques for responding to these severe transients typically reduce the slew rate and regulator accuracy. However, in accordance with various aspects of the present invention, a wideband voltage regulator can be provided which provides improved transient suppression.

In accordance with an exemplary embodiment, a voltage regulator can include a boosting circuit and a sensing circuit. The boosting circuit can be suitably configured to boost the voltage regulator response, while the sensing circuit can determine when such a boost may be desired. Accordingly, the response of the voltage regulator can be accelerated to a fast load transient beyond the closed loop bandwidth limited response or the slew rate limited response of the voltage regulator.

Figure 4:
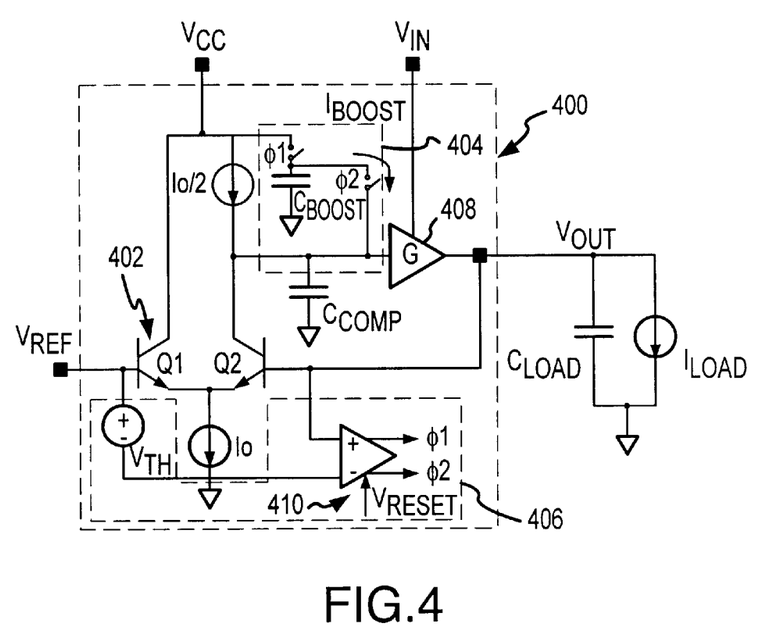
FIG. 4 illustrates a schematic diagram of an exemplary embodiment of a voltage regulator in accordance with the present invention.

With reference to FIG. 4, an improved exemplary voltage regulator 400 is illustrated. In the exemplary embodiment, voltage regulator 400 includes an input power supply $V_{IN}$, a regulated output supply $V_{OUT}$, a voltage source $V_{CC}$ configured to bias the circuitry of regulator 400 and which may be common with input power supply $V_{IN}$, a voltage reference $V_{REF}$ which determines the regulated output voltage $V_{OUT}$, a compensation capacitor $C_{COMP}$, an amplifier 402, and an amplifier 408. Amplifier 402 suitably comprises a closed loop differential transconductance amplifier formed by transistors Q1 and Q2, while amplifier 408 comprises an output buffer amplifier having a gain G. During operation, load current supplied to $V_{OUT}$ is primarily drawn from the $V_{IN}$ Supply. Closed loop differential amplifier 402 is configured to sense the difference between output voltage $V_{OUT}$ and reference voltage $V_{REF}$ and, through a feedback arrangement to minimize the difference between the two voltages, $V_{OUT}$ and $V_{REF}$.

To facilitate the improved transient suppression, voltage regulator 400 suitably includes a boosting circuit 404 and a sensing circuit 406. Boosting circuit 404 suitably comprises a stored charge source and a switching arrangement comprising switching devices $\phi1$ and $\phi2$.

The stored charge sources can comprise various components, such as, for example, boost capacitors, additional power supplies, or actively biased devices. In accordance with an exemplary embodiment, the stored charge source comprises a voltage boosting capacitor $C_{BOOST}$. However, it should be noted that voltage boosting capacitor $C_{BOOST}$ is included merely for the purposes of illustration, and that the stored charge source is not limited to such a configuration.

In accordance with an exemplary embodiment, boosting capacitor $C_{BOOST}$ can comprise various capacitance values, for example, between a 1 pF to 100 nf capacitance value. However, $C_{BOOST}$ can also comprise any other capacitance values which can be suitably scaled based upon the load to voltage regulator 400. Switching devices $\phi1$ and $\phi2$ can comprise any suitable switching mechanism, e.g., various types of transistor devices, such as FET or BJT devices. Boost capacitor $C_{BOOST}$ is suitably configured to be initially connected between bias voltage $V_{CC}$ and ground during a charging phase through closure of switching device $\phi1$ and opening of switching device $\phi2$, and then connected in parallel across the terminals of compensation capacitor $C_{COMP}$ during a boosting phase through and opening of switching device $\phi1$ and closure of switching device $\phi2$.

Sensing circuit 406 suitably includes a threshold voltage ($V_{TH}$), which is configured to permit sensing circuit to determine when the voltage $V_{OUT}$ droops or otherwise decreases as a result of load transients. Threshold voltage $V_{TH}$ can comprise various values depending on any number of design criteria in an exemplary embodiment, threshold voltage $V_{TH}$ can comprise between 1% to 10% of output voltage $V_{OUT}$, or other smaller percentage values of output voltage $V_{OUT}$. In accordance with this exemplary embodiment, threshold voltage $V_{TH}$ is suitably coupled to reference voltage $V_{REF}$, i.e., to the base of transistor $Q_1$. Sensing circuit 406 also includes a control device 410 that is configured to command switch controls φ1 and φ2. Control device 410 includes a positive terminal coupled to the output of output buffer amplifier 408, and a negative terminal coupled to threshold voltage $V_{TH}$.

During operation, switch φ1 is initially "closed" and switch φ2 is "opened," and boost capacitor $C_{BOOST}$ is charged to the same potential as biasing voltage source $V_{CC}$, which is generally at a higher potential than the voltage across compensation capacitor $C_{COMP}$. When a load current transient event results in a droop or falling of output voltage $V_{OUT}$ in excess of the difference between the reference voltage $V_{REF}$ and a threshold voltage $V_{TH}$, sensing circuitry 406 can suitably open switch φ1 and close switch φ2, thereby providing additional stored charge to boost the voltage across compensation capacitor $C_{COMP}$. Accordingly, the voltage across compensation capacitor $C_{COMP}$ can then be buffered by output amplifier 408 with gain G, such as, for example, a unity gain amplifier, thereby accelerating the response of voltage regulator 400 to the load transient beyond the closed loop bandwidth limited or slew rate limited response of a conventional regulator. Generally the bandwidth of buffer amplifier 408 is an order of magnitude greater than the closed loop bandwidth of overall amplifier 402, thereby rendering the boosted regulator response superior to the conventional closed loop response, e.g., an improvement of 10 to 50 times in bandwidth.

Figure 5:
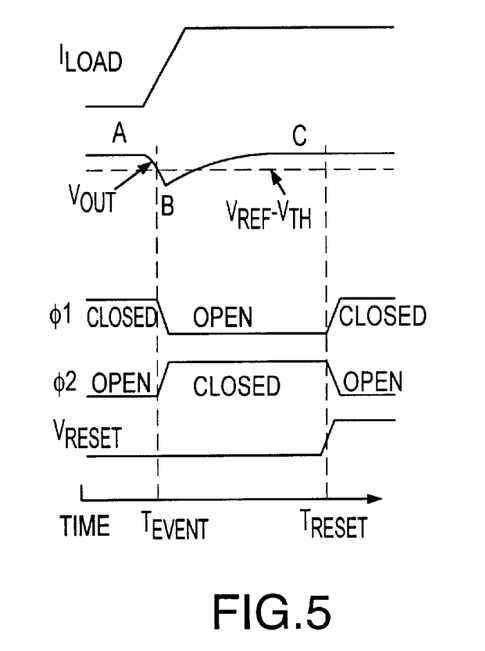
FIG. 5 illustrates diagrams of load transient and regulator waveforms for the exemplary embodiment illustrated in FIG. 4.

To appreciate the significance in improvement, waveforms illustrating exemplary load transient and regulator waveforms are illustrated in FIG. 5. To maximize the effectiveness of the boost capacitor $C_{BOOST}$, sensing circuitry 406 can be configured to operate as a one-shot device, with the pulse width selected such that the switches φ1 and φ2 change from "closed" to "open," and from "open" to "closed," respectively, only once when the difference between reference voltage $V_{REF}$ and a threshold voltage $V_{TH}$ is initially crossed by output voltage $V_{OUT}$, i.e., when output voltage $V_{OUT}$ falls below the difference between reference voltage $V_{REF}$ and threshold voltage $V_{TH}$. In accordance with an exemplary embodiment, the selected pulse width comprises a narrow, limited pulse width. Thereafter, switches φ1 and φ2 can be internally reset after a time interval, for example an interval equal to $t_{reset}-t_{event}$, which is selected to be larger than the expected duration of the fast load transient event. In addition, switches φ1 and φ2 can be internally reset after detecting that output voltage $V_{OUT}$ has been sufficiently boosted to its desired level. Moreover, switches φ1 and φ2 can be internally reset after first detecting output voltage $V_{OUT}$ has been boosted to an initial level, and then waiting for a given time interval to occur before resetting. It should be noted that other similar variations are also contemplated herein.

Boosting circuit 404 can be suitably configured in various manners to provide a stored charge to boost the voltage across compensation capacitor $C_{COMP}$. For example, a boosting circuit can suitably comprise an array of N stored charge sources, e.g., boost capacitors, and (3N−1) switches, that are configured to facilitate acceleration of the voltage regulators response to a fast load transient beyond the closed loop bandwidth limited, or the slew rate limited response of the voltage regulator.

Figure 6:
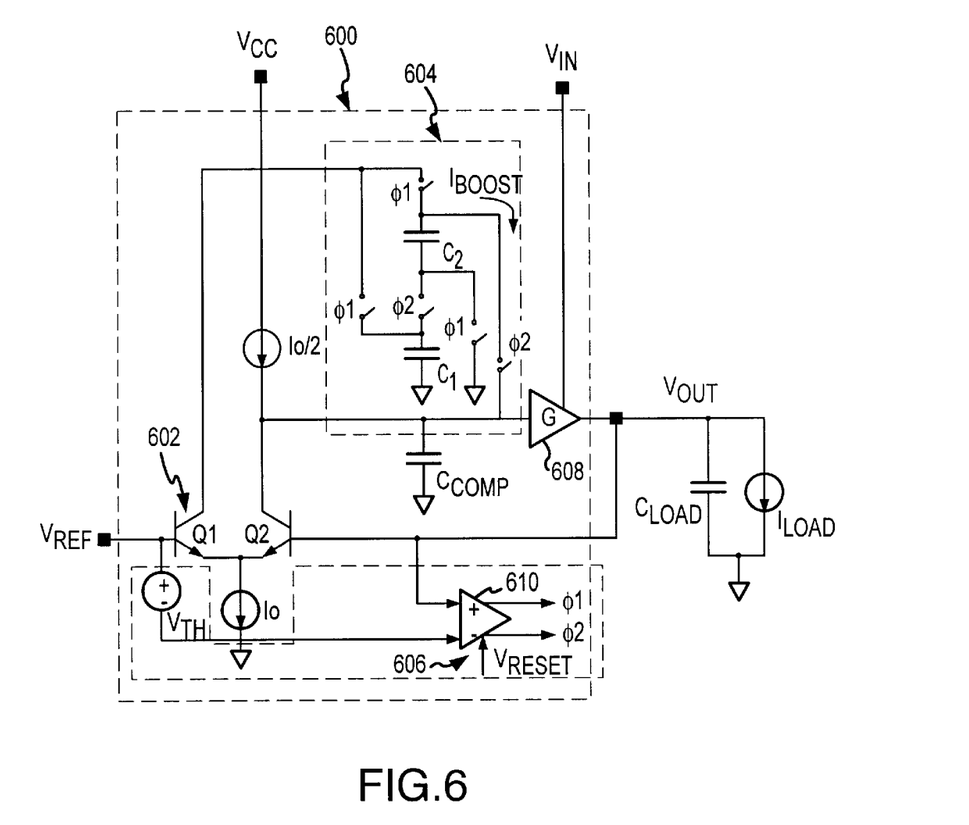
FIG. 6 illustrates a schematic diagram of another exemplary embodiment of a voltage regulator in accordance with the present invention.

With reference to FIG. 6, another exemplary embodiment of a voltage regulator is illustrated. In this exemplary embodiment, a voltage regulator 600 suitably includes a closed loop amplifier 602 and an output buffer amplifier 608, a boosting circuit 604 and a sensing circuit 606. Boosting circuit 604 is suitably configured such that a boost capacitor $C_{BOOST}$ comprises an array of capacitors in series and/or parallel along with an array of switches, such as two switches each for φ1 and φ2. For example, boosting circuit 602 can include at least two capacitors, $C_1$ and $C_2$ configured in an array, which can be comprised of various capacitance values as described above. Sensing circuit 608 suitably includes a threshold voltage ($V_{TH}$), and a control device 610 that is configured to command switch controls φ1 and φ2.

During operation, switches φ1 are "closed" and switches φ2 are "opened" to suitably charge both of capacitors $C_1$ and $C_2$ to the potential of bias voltage $V_{CC}$. When a transient event is detected, for example as described above, switches φ1 are suitably "opened" and switches φ2 are "closed." An improvement of this configuration of voltage regulator 600 over the configuration of voltage regulator 400 can be realized if one considers the case of $C_1=C_2=C_{BOOST}$, wherein $C_{BOOST}$ is the compensation capacitor of voltage regulator 400, e.g., the total boost potential is twice the level of voltage regulator 400. In addition to significantly increasing the total transferred stored charge, the total capacitance placed in parallel with amplifier compensation capacitor $C_{COMP}$ can be reduced to $C_{BOOST}/2$, thus resulting in an improved closed loop bandwidth response once the boost charge has been redistributed.

While the above exemplary embodiment illustrates two boost capacitors $C_1$ and $C_2$, as well as two switches each for φ1 and φ2, again it should also be noted that the various exemplary embodiments can be readily scaled to N boost capacitors, wherein the N boost capacitors are initially connected in parallel between bias voltage $V_{CC}$ and ground during the charging phase, and then placed in series across the terminals of compensation capacitor $C_{COMP}$ during the boosting phase.

In addition to the various methods and configurations for boosting the voltage response, the sensing circuit can also be configured in various other manners to detect when a boost of output voltage $V_{OUT}$ is desired. For example, with reference to FIG. 7, an exemplary voltage regulator 700 suitably includes a closed loop amplifier 702 and an output buffer amplifier 708, a boosting circuit 704 and a sensing circuit 706. Boosting circuit 704 can comprise various configurations, such as exemplary boosting circuits 404 or 604, or an exemplary boosting circuit comprising an array of N boost capacitors and (3N−1) switches.

Figure 7:
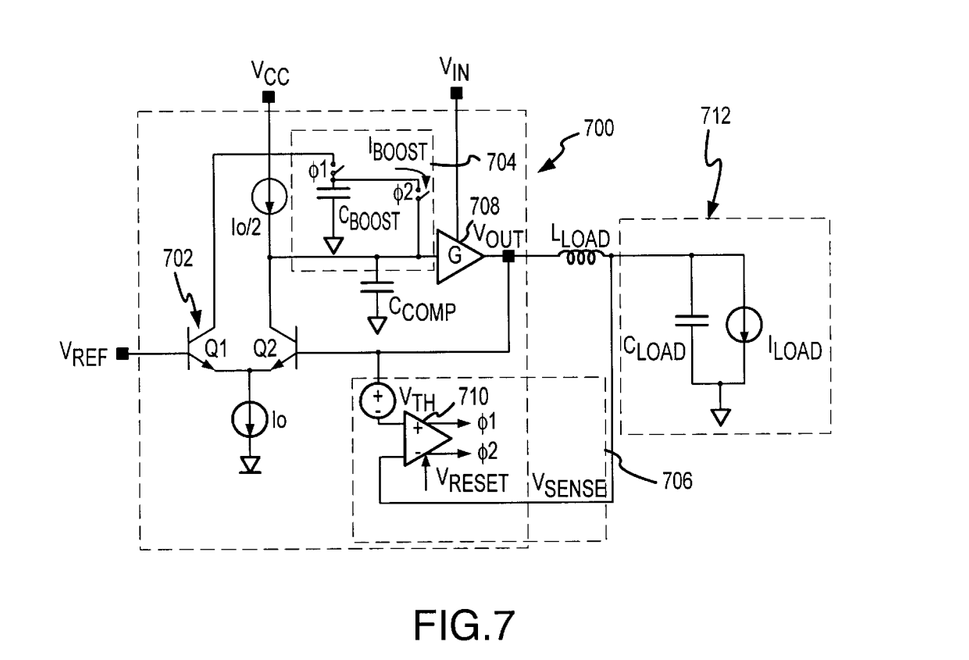
FIG. 7 illustrates a schematic diagram of yet another exemplary embodiment of a voltage regulator in accordance with the present invention.

Sensing circuit 706 suitably includes a threshold voltage ($V_{TH}$), which is configured to permit sensing circuit 706 to determine when the voltage $V_{OUT}$ droops as a result of load transients. In accordance with this exemplary embodiment, threshold voltage $V_{TH}$ is suitably coupled to the output of output buffer amplifier 708, i.e., to the base of transistor Q2. Sensing circuit 706 also includes a control device 710 that is configured to command switch controls φ1 and φ2. Control device 710 includes a positive terminal coupled to threshold voltage $V_{TH}$, and a negative terminal coupled to the output of output buffer amplifier 708 as discussed below.

In accordance with this exemplary embodiment, the parasitic inductance, e.g., $L_{LOAD}$, associated with the physical interconnect between voltage regulator 700 and load circuit 712 can be used to determine when a boost to output voltage $V_{OUT}$ may be desirable. For example, parasitic inductance $L_{LOAD}$ can be suitably coupled between the negative terminal of control device 710 and the output of output buffer amplifier 708. It should be noted that the voltage drop sensed across the parasitic inductance $L_{LOAD}$ is directly related to the rate of change of the load transient by the expression $\Delta V = L_{LOAD} * \Delta I_{LOAD}/\Delta t$. Therefore, boost circuit 704 can be more easily configured to react to only fast load transients and to ignore slower load transients that can be more effectively suppressed by the basic closed loop regulator action.

During a fast load transient event, the voltage drop created across inductor $L_{LOAD}$ an be sensed and compared by control device 710 to a pre-determined threshold voltage ($V_{TH}$). Accordingly, when a load current transient event results in a voltage drop across inductor $L_{LOAD}$ in excess of a predetermined threshold voltage ($V_{TH}$), sensing circuitry 706 can suitably "open" switch φ1 and "close" switch φ2, thereby providing additional stored charge to boost the voltage across capacitor $C_{COMP}$. This voltage across capacitor $C_{COMP}$ can then be buffered by output amplifier 708 with gain G, such as a unity gain amplifier, thereby accelerating the response of voltage regulator 700 to the load transient beyond the closed loop bandwidth limited or slew rate limited response of a conventional regulator.

Figure 8:
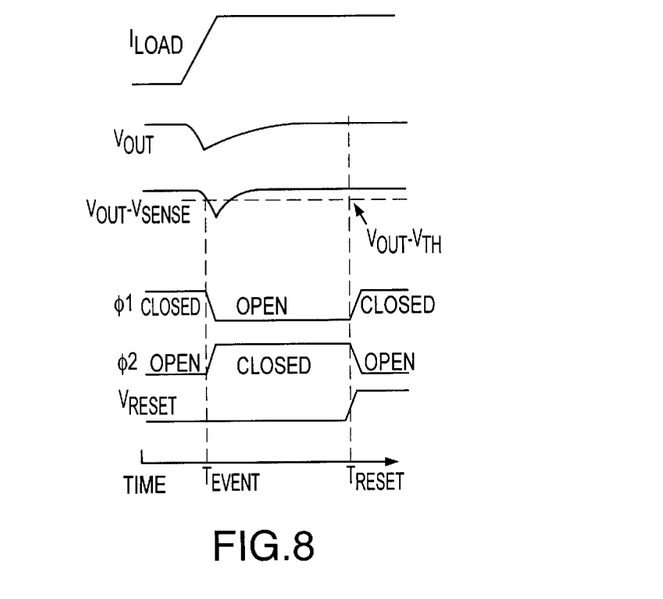
FIG. 8 illustrates diagrams of load transient and regulator waveforms for the exemplary embodiment of a voltage regulator as illustrated in FIG. 7.

With reference to FIG. 8, exemplary load transient and regulator waveforms of voltage regulator 700 are illustrated. To maximize the effectiveness of the boost capacitor $C_{BOOST}$, sensing circuitry 706 can operate as a one-shot device, with the pulse width selected such that the switches φ1 and φ2 change from "closed" to "open," and from "open" to "closed," respectively, only once when the level of threshold voltage $V_{TH}$ is initially crossed. Thereafter, switches φ1 and φ2 can be internally reset-after a time interval, for example an interval equal to $t_{reset}-t_{event}$, which can be selected to be larger than the expected duration of the fast load transient event. In addition, switches φ1 and φ2 can be internally reset after detecting that the voltage $V_{OUT}$ has been sufficiently boosted to its desired level. Moreover, switches φ1 and φ2 can be internally reset after first detecting output voltage $V_{OUT}$ has been boosted to an initial level, and then waiting for a given time interval to occur before resetting. It should be noted that other similar variations are also contemplated herein.

Various other exemplary embodiments of the sensing circuitry can be envisioned when the parasitic inductance of the load ground path is similar to the supply path. For example, in accordance with an exemplary embodiment, the voltage drop across the supply side inductor can be sensed and can be differentially compared to the voltage drop across the ground side inductor, with the resulting differential voltage used to drive the boost capacitor $C_{BOOST}$. In addition, a differential offset voltage can also be added to the sensed difference voltage to set the sensitivity of the sense circuitry 706 as desired.

Figure 9:
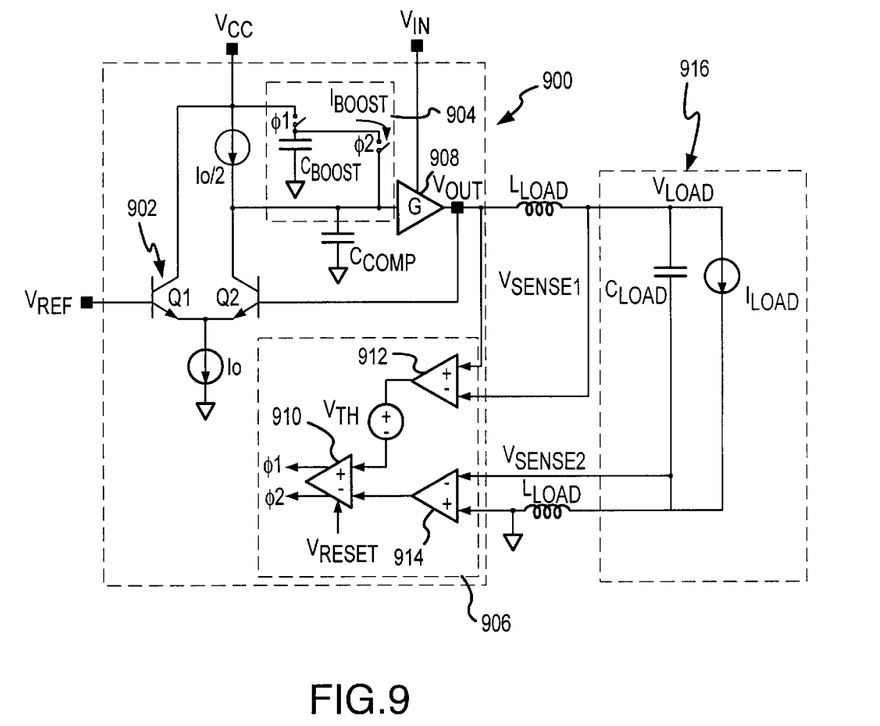
FIG. 9 illustrates a schematic diagram of yet a further exemplary embodiment of a voltage regulator in accordance with the present invention.

For example, with reference to FIG. 9, an exemplary voltage regulator 900 suitably includes a closed loop amplifier 902 and an output buffer amplifier 908, a boosting circuit 904 and a sensing circuit 906. In accordance with this exemplary embodiment, sensing circuit suitably comprises three control devices 910, 912 and 914 that are configured together to command switch controls φ1 and φ2. Control device 912 includes a positive terminal coupled to output voltage $V_{OUT}$ and a negative terminal coupled to the parasitic inductance $L_{LOAD}$ associated with the physical interconnect between voltage regulator 900 and a load circuit 912, i.e., the negative terminal is coupled to $V_{SENSE1}$. Control device 914 includes a positive terminal coupled ground and a negative terminal coupled to a load capacitor $C_{LOAD}$, i.e., the negative terminal is coupled to $V_{SENSE2}$. In addition, control device 710 includes a positive terminal coupled to threshold voltage $V_{TH}$, which is coupled to the output of control device 912, and a negative terminal coupled to the output of control device 914. As a result, a differential offset voltage provided the output of control device 914 can also be added to the sensed difference voltage provided by the output of control device 912 to set the sensitivity of the sense circuitry 906.

It should also be noted that the above exemplary embodiments of the invention can be configured for boosting in response to high to low load transients, as well by connecting both boost capacitor terminals to ground during a pre-positioning stage, thereby depleting the capacitors of stored charge. Accordingly, when the depleted capacitor(s) are then connected to the active node of compensation capacitor $C_{COMP}$, the circuit is accelerated in the negative going direction.

In addition, a voltage regulator can be configured with an active sensing circuit comprising a sense amplifier with switch control outputs, and a boosting circuit comprising N boost capacitors and (3N-1) switches that are configured to accelerate the voltage regulators response to a fast load transient beyond the closed loop bandwidth limited or slew rate limited response of the voltage regulator. In addition, a method for determining when the sensing circuit can switch the state of the boost capacitors can comprise a comparison of the output voltage of the regulator to a constant reference voltage. In addition, the sensing circuit can switch the state of the boost capacitors by comparing the voltage drop across the parasitic inductance between the voltage regulator output and the load to a constant reference voltage, or by comparing the difference between the voltage drop across the parasitic inductance of the supply side and the ground return of the load. Further, the sensing circuit can be triggered on a one-shot basis with preset pulse width, or by any other suitable trigger methodology. Still further, a differential offset voltage can be added to the sense amplifier to suitably adjust or configure the sensitivity of the sensing circuit.

In summary, a wideband voltage regulator is provided which can facilitate suppression of fast transients. In accordance with an exemplary embodiment, a voltage regulator can include a boosting circuit and a sensing circuit, with the boosting circuit suitably configured to boost the voltage regulator response, while the sensing circuit can determine when such a boost may be desired. Accordingly, the response of the voltage regulator can be accelerated to a fast load transient beyond the closed loop bandwidth limited response or the slew rate limited response of the voltage regulator.

The present invention has been described above with reference to various exemplary embodiments. However, those skilled in the art will recognize that changes and modifications may be made to the exemplary embodiments without departing from the scope of the present invention. For example, the various components may be implemented in alternate ways, such as, for example, by providing other configurations of transconductance amplifiers, e.g., with PNP transistors or configurations other than the bipolar transistor embodiments illustrated, that are now known or hereinafter devised. Moreover, while sensing circuits can be configured to sense the inductance near the load, or near ground, the sensing circuit can be configured to sense the parasitic inductance anywhere between and/or on the load circuit. These alternatives can be suitably selected depending upon the particular application or in consideration of any number of factors associated with the operation of the system. Moreover, these and other changes or modifications are intended to be included within the scope of the present invention, as set forth in the following claims.

What is claimed is:

1. A voltage regulator configured for providing for the suppression of current transients, said voltage regulator comprising:

a closed loop amplifier for determining a difference between a reference voltage and an output voltage;

a compensation capacitor coupled to said closed loop amplifier;

an output buffer amplifier coupled to said compensation capacitor, said output buffer amplifier being configured to provide an output for said voltage regulator comprising the output voltage;

a boosting circuit coupled to said closed loop amplifier and said compensation capacitor and being configured for providing a boosted voltage charge, said boosting circuit comprising at least one stored charge source and at least two switching devices; and a sensing circuit configured for sensing a load transient event to permit said boosted voltage charge to be provided to an input of said output buffer amplifier, said sensing circuit comprising a threshold voltage and a control device for controlling operation of said at least two switching devices, and wherein said sensing circuit operates said at least two switching devices based on occurrence of the load transient event such that an accelerated response of said voltage regulator to a fast load transient beyond at least one of a closed loop bandwidth limited response and a slew rate limited response of said voltage regulator can be realized.

2. The voltage regulator according to claim 1, wherein said load transient event occurs when the output voltage falls below a difference between the output voltage and a threshold voltage.

3. The voltage regulator according to claim 1, wherein said boosting circuit comprises at least one boosting capacitor.

4. The voltage regulator according to claim 1, wherein said boosting circuit comprises N stored charge sources and 3N−1 switching devices.

5. The voltage regulator according to claim 1, wherein said sensing circuit is configured for facilitating the providing of said boosted voltage charge to said output buffer amplifier by comparing the output voltage of said output buffer amplifier to the reference voltage.

6. The voltage regulator according to claim 5, wherein said sensing circuit is triggered on a one-shot basis to provide said boosted voltage charge to said output buffer amplifier through operation of said at least two switching devices.

7. The voltage regulator according to claim 6, wherein operation of said at least two switching devices is reset after a predetermined time interval.

8. The voltage regulator according to claim 6, wherein operation of said at least two switching devices is reset after determining that the output voltage has been boosted to a desired level.

9. The voltage regulator according to claim 6, wherein operation of said at least two switching devices is reset after a preselected pulse width.

10. The voltage regulator according to claim 1, wherein said sensing circuit is configured for facilitating the providing of said boosted voltage charge to said output buffer amplifier by comparing a voltage drop across a parasitic inductance, said parasitic inductance being configured between the output of said voltage regulator and a load device, to the reference voltage.

11. The voltage regulator according to claim 10, wherein said sensing circuit is triggered on a one-shot basis to provide said boosted voltage charge to said output buffer amplifier through operation of said at least two switching devices.

12. The voltage regulator according to claim 11, wherein operation of said at least two switching devices is reset after a predetermined time interval.

13. The voltage regulator according to claim 11, wherein operation of said at least two switching devices is reset after determining that the output voltage has been boosted to a desired level.

14. The voltage regulator according to claim 11, wherein operation of said at least two switching devices is reset after a preselected pulse width.

15. The voltage regulator according to claim 1, wherein said sensing circuit is configured for facilitating the providing of said boosted voltage charge to said output buffer amplifier by comparing a difference between a voltage drop across a parasitic inductance of a supply side of a load device and a parasitic inductance of a ground side of the load device.

16. The voltage regulator according to claim 1, wherein a differential offset voltage is added to a sensed difference voltage to provide a sensitivity setting of said sensing circuit.

17. An integrated circuit configured for the suppression of current transients occurring within said integrated circuit, said integrated circuit comprising:

an input power supply terminal for receiving an input power supply;

a reference voltage terminal for receiving a reference voltage; and a voltage regulator coupled to said input power supply terminal and said reference voltage terminal and configured for providing an output voltage, said voltage regulator comprising:

a closed loop amplifier configured for minimizing a difference in voltage between the reference voltage and the output voltage;

a compensation capacitor coupled to said closed loop amplifier;

an output buffer amplifier having an input terminal coupled to said compensation capacitor, said output buffer amplifier having an output terminal coupled to the output voltage of said voltage regulator;

a boosting circuit coupled to said closed loop amplifier and said compensation capacitor and being configured for providing a boosted voltage charge, said boosting circuit comprising at least one stored charge source and at least two switching devices; and a sensing circuit comprising a threshold voltage and a control device for controlling operation of said at least two switching devices, said sensing circuit being configured for providing an accelerated response of said voltage regulator by permitting said boosted voltage charge to be provided to an input of said output buffer amplifier upon determination that the output voltage falls below said threshold voltage.

18. The integrated circuit according to claim 17, wherein said boosting circuit is configured with said at least two switching devices to be connected between a bias voltage and ground during a charging phase and to be connected in parallel with said compensation capacitor during a boosting phase.

19. The integrated circuit according to claim 17, wherein said boosting circuit comprises at least one boosting capacitor.

20. The integrated circuit according to claim 18, wherein said boosting circuit comprises N boost capacitors and 3N−1 switching devices.

21. The integrated circuit according to claim 19, wherein said N boost capacitors comprise a total capacitance between 1 pF and 100 nF, said total capacitance being scaled based on a load device coupled to said voltage regulator.

22. The integrated circuit according to claim 17, wherein said sensing circuit is configured for switching said boosted voltage charge to said output buffer amplifier by comparing the output voltage to the reference voltage.

23. The integrated circuit according to claim 17, wherein said sensing circuit is triggered on a one-shot basis to provide said boosted voltage charge to said output buffer amplifier through operation of said at least two switching devices.

24. The voltage regulator according to claim 17, wherein operation of said at least two switching devices is reset after occurrence of at least one of a determination that the output voltage has been boosted to a desired level, after a predetermined time interval and after a preselected width pulse.

25. The integrated circuit according to claim 17, wherein said sensing circuit is configured for facilitating the providing of said boosted voltage charge to said output buffer amplifier by comparing a voltage drop across a parasitic inductance to the reference voltage, said parasitic inductance being configured between the output of said voltage regulator and a load device.

26. The integrated circuit according to claim 17, wherein said sensing circuit is configured for facilitating the providing of said boosted voltage charge to said output buffer amplifier by comparing a difference between a voltage drop across a parasitic inductance of a supply side of a load device and a parasitic inductance of a ground side of the load device.

27. The integrated circuit according to claim 17, wherein a differential offset voltage is added to a sensed difference voltage to provide a sensitivity setting of said sensing circuit.

28. A method for suppressing current transients in a voltage regulator, said method comprising the steps of:

determining a voltage difference between a reference voltage and an output voltage in said voltage regulator;

minimizing said voltage difference between the reference voltage and the output voltage with a closed loop amplifier through use of a compensation capacitor;

charging a stored charge source in a boosting circuit to provide a boosted charge voltage, said boosting capacitor coupled between a bias voltage and ground;

determining when the output voltage falls below a difference between the reference voltage and a threshold voltage through use of a sensing circuit; and boosting the output voltage through operation of said sensing circuit until a desired voltage level is obtained.

29. The method according to claim 28, wherein said boosting circuit comprises at least one boosting capacitor.

30. The method according to claim 28, wherein said boosting circuit comprises N boost capacitors and 3N−1 switching devices, and said step of charging comprises closing at least one of said 3N−1 switching devices such that said boosting capacitor is coupled between a bias voltage and ground.

31. The method according to claim 28, wherein said step of determining when the output voltage falls below a threshold voltage comprises comparing with said sensing circuit the output voltage with the reference voltage.

32. The method according to claim 28, wherein said step of determining when the output voltage falls below a threshold voltage comprises comparing with said sensing circuit a voltage drop across a parasitic inductance to the reference voltage, said parasitic inductance being configured between an output of said voltage regulator and a load device.

33. The method according to claim 28, wherein said step of determining when the output voltage falls below a threshold voltage comprises comparing with said sensing circuit a difference between a voltage drop across a parasitic inductance of a supply side of a load device and a parasitic inductance of a ground side of the load device.

34. The method according to claim 28, wherein said step of boosting the output voltage through operation of said sensing circuit comprises triggering said boosted circuit on a one-shot basis to provide said boosted voltage charge to the output voltage.

35. The method according to claim 28, further comprising the step of adding differential offset voltage to a sensed difference voltage to provide a sensitivity setting of said sensing circuit.

36. The method according to claim 28, further comprising the step of resetting said at least two switching devices after occurrence of at least one of a determination that the output voltage has been boosted to a desired level, after a predetermined time interval and after a preselected width pulse.

* * * * *